United States Patent

Mason

[11] Patent Number: 5,507,101
[45] Date of Patent: Apr. 16, 1996

[54] VEHICLE ALIGNMENT GAUGING APPARATUS

[76] Inventor: James H. Mason, 2 Wellington Street, Narrabeen N.S.W. 2101, Australia

[21] Appl. No.: 373,309

[22] PCT Filed: Jul. 20, 1993

[86] PCT No.: PCT/AU93/00362

§ 371 Date: Jan. 20, 1995

§ 102(e) Date: Jan. 20, 1995

[87] PCT Pub. No.: WO94/02801

PCT Pub. Date: Feb. 3, 1994

[30] Foreign Application Priority Data

Jul. 20, 1992 [AU] Australia ................... PL3604

[51] Int. Cl.$^6$ ................................................. G01B 5/14
[52] U.S. Cl. ........................... 33/608; 33/288; 33/760
[58] Field of Search ........................... 33/286, 288, 354, 33/379, 418, 419, 451, 452, 464, 465, 533, 600, 608, 645, 760

[56] References Cited

U.S. PATENT DOCUMENTS

| | | |
|---|---|---|
| 1,597,357 | 8/1926 | Godfrey . |
| 2,112,917 | 4/1938 | Linn . |
| 3,528,178 | 9/1970 | Kunzler . |
| 3,869,804 | 3/1975 | Friend ........................ 33/288 |
| 4,321,754 | 3/1982 | Colby . |
| 4,407,073 | 10/1983 | Nilsson et al. . |
| 4,408,399 | 10/1983 | Darwood et al. . |
| 4,453,315 | 6/1984 | Mosiman et al. . |
| 4,523,384 | 6/1985 | Giacomini ........................ 33/608 |
| 4,577,413 | 3/1986 | Mason . |
| 4,610,093 | 9/1986 | Jarman et al. . |
| 4,683,663 | 8/1987 | Sarauer . |
| 5,131,257 | 7/1992 | Mingardi ........................ 33/608 |
| 5,343,628 | 9/1994 | Ham ........................ 33/608 |
| 5,430,951 | 7/1995 | Jacky ........................ 33/760 |

FOREIGN PATENT DOCUMENTS

| | | |
|---|---|---|
| 5758/66 | 11/1968 | Australia . |
| 71442/74 | 1/1976 | Australia . |
| A10276 | 9/1983 | Australia . |
| 31839/84 | 2/1985 | Australia . |
| 70140/87 | 9/1987 | Australia . |
| 73800/87 | 10/1987 | Australia . |
| B19014/88 | 3/1990 | Australia . |
| A30233/92 | 6/1993 | Australia . |
| 0085253 | 8/1983 | European Pat. Off. . |
| 53-98563 | of 1978 | Japan . |
| 55-141007 | of 1980 | Japan . |
| 57-146005 | of 1982 | Japan . |
| 57-156501 | 9/1982 | Japan . |
| 56-148002 | 11/1982 | Japan ........................ 33/608 |
| 58-45168 | of 1983 | Japan . |
| 2015740 | 9/1979 | United Kingdom . |
| 2084327 | 4/1982 | United Kingdom . |
| PCT/US80/ 01659 | 6/1981 | WIPO . |
| WO85/00219 | 1/1985 | WIPO ........................ 33/608 |

OTHER PUBLICATIONS

International Search Report for PCT/AU92/00362 filed Oct. 9, 1993.
International Search Report for PCT/AU93/0362 filed Jul. 20, 1993.

Primary Examiner—William A. Cuchlinski, Jr.
Assistant Examiner—G. Bradley Bennett
Attorney, Agent, or Firm—Marshall & Melhorn

[57] ABSTRACT

A vehicle gauging apparatus (1) including a datum bar (2) and a pair of first carriage assemblies (10) slidably mounted to said bar. Attachment means (12) are adapted releasably to secure each carriage (10) to a respective datum point (15) on the vehicle (16) and thereby attach the datum bar (2) to the vehicle. A trammel bar (20) is connected to one end of the datum bar (2) by connection means (21) adjustable to selected positions along the datum bar. The connection means permits at least a limited degree of universal movement of the trammel bar (20) relative to the datum bar. Reference means (32) on the trammel bar (20) provide a comparative indication of misalignment in the vehicle (16).

35 Claims, 4 Drawing Sheets

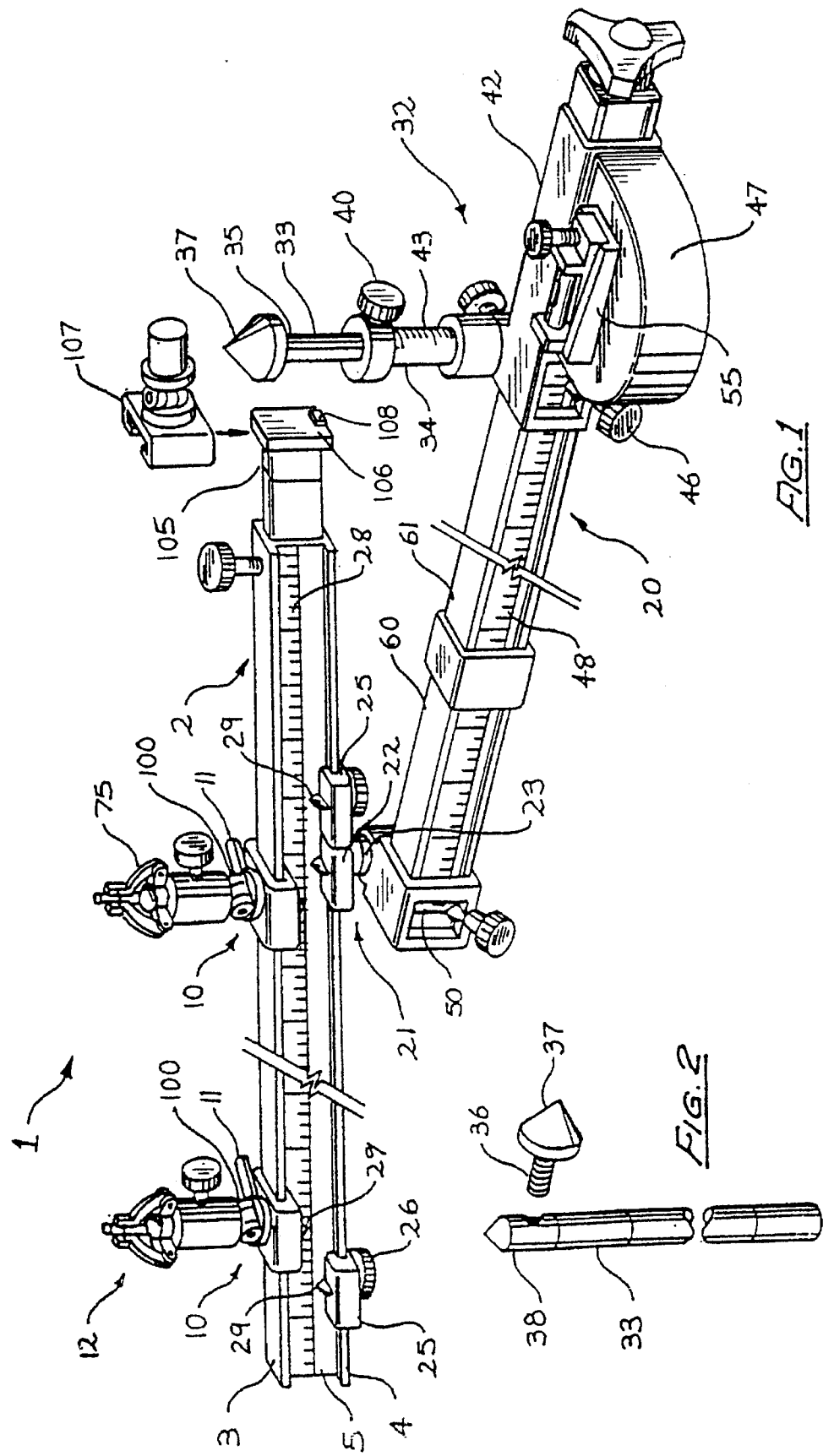

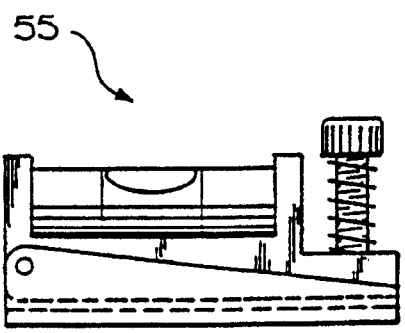
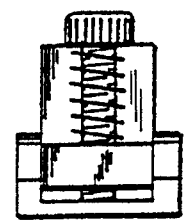
FIG. 4   FIG. 5
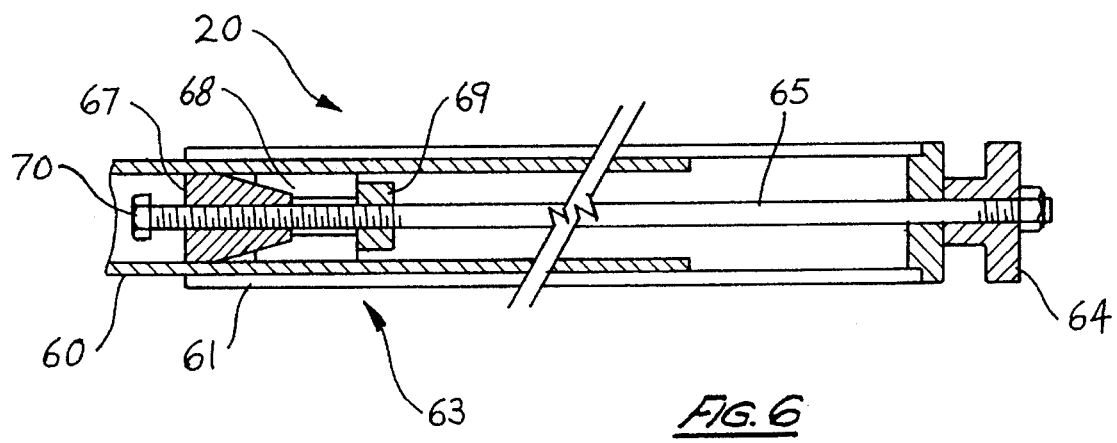
FIG. 6

VEHICLE ALIGNMENT GAUGING APPARATUS

FIELD OF THE INVENTION

The present invention relates to an apparatus for measuring, and assisting in the alignment and repair, of damaged or potentially damaged structural members. It has particular application to the automotive and panel beating industries.

BACKGROUND OF THE INVENTION

In the manufacture of automobiles, it is common practice to provide specific datum points in the structure to assist in "jigging" the vehicle during manufacture, and in checking the dimensional accuracy of the finished product. These datum points can take various forms such as holes in the chassis, male or female threaded members such as bolt heads, nuts or studs, and other formations such as pins, lugs, and suspension mounting points. They may be oriented in vertical or horizontal planes, or at intermediate angles. They also vary significantly from model to model according to various design parameters and practical convenience. In all cases, however, they are accurately positioned in known locations and the design specification of each vehicle normally includes a table of dimensions which correlate the various datum points.

Numerous types of known apparatus purport to provide an indication of the extent of misalignment, to facilitate the evaluation and repair of damaged or potentially damaged vehicles. However, these have been found to be inadequate in various respects.

More particularly, one type of prior art device consists in a peripheral reference frame rotatably or otherwise connected to a floor mounted anchorage assembly to extend generally around the vehicle. Such devices are not adapted for direct connection to the datum points on the vehicle, and so are not able to provide an accurate and direct quantitative correlation between the various datum points and the manufacturer's specifications.

Moreover, such devices tend to be structurally flimsy, and are inherently prone to excessive deflection, particularly adjacent the front and rear extremities of the vehicle, where accurate measurement is critical. Also, in such measurement systems it is difficult or impossible to align the vehicle precisely with the floor mounted anchorage assembly. For both these reasons, such devices are not capable even of providing accurate and consistent comparative measurements between corresponding points on the vehicle to provide a reliable measure of the degree of misalignment.

Other known devices are adapted for direct connection to datum points and so to a limited extent are capable of directly correlating measurements between datum points on the vehicle with dimensional specifications provided by the manufacturer. However, most such devices are complex, expensive, cumbersome, involve a relatively large number of components, and are generally difficult and time consuming to use. Furthermore, most known devices of this type are only capable of providing quantitative measurements between longitudinally or transversely spaced datum points. As such, they cannot measure or compare diagonals directly and so cannot accurately detect parallelogram type deformation in the vehicle frame. Moreover, a number of manufacturers actually specify distances in their data sheets in terms of diagonals, and these cannot be directly correlated using this known type of apparatus. Furthermore, prior art systems of this type are generally only capable of attachment to certain specific types of datum points, and so tend not to be applicable to a wide variety of vehicles.

For certain makes and models of vehicle dedicated jigs, frames, or the like are available. Again, however, these tend to be expensive and require considerable set-up time. Consequently, such devices tend only to be appropriate and worthwhile in connection with major repairs and again, they are not applicable to a wide range of vehicles.

More simple devices in the form of hand-held trammels are also known. However, these too are limited in their practical applicability. They require constant re-checking and frequently two operators are required, one to support and position each end. There are also practical limits in terms of the distances which such devices are capable of measuring. In this regard, fixed length trammels tend to be excessively long and cumbersome to provide accurate measurements of relatively short dimensions and even telescopic arrangements tend to be limited in this respect relative to the length of the longest telescoping element.

It is therefore an object of the present invention to provide an improved apparatus which overcomes or substantially ameliorates at least some of these disadvantages of the prior art.

DISCLOSURE OF THE INVENTION

Accordingly, the invention consists in a vehicle gauging apparatus including a datum bar, a pair of first carriage assemblies slidably mounted to said bar, attachment means adapted releasably to secure each said carriage to a respective datum point on the vehicle and thereby to attach the datum bar thereto in a generally transverse orientation, a trammel bar connected at one end to said datum bar by connection means adjustable to selected positions along the datum bar and permitting at least a limited degree of universal movement of the trammel bar relative to the datum bar, and reference means on the trammel bar to provide a comparative indication of misalignment in the vehicle.

It will be appreciated that the ability of the connection means to be adjusted to selected positions along the datum bar and to permit a degree of universal movement of the trammel bar relative to the datum bar enables comparative diagonal measurements to be taken directly from corresponding points on either side of the vehicle as well as permitting direct comparison of orthogonal measurements.

Preferably, the datum bar is adapted to be suspended generally transversely beneath the vehicle.

In the preferred embodiment, the connection means comprises a connecting carriage adapted to traverse the datum bar, and an associated universal joint in the form of a double swivel mounted to the carriage to permit independent relative rotation about vertical and horizontal orthogonal axes.

Preferably also, the transverse datum bar is generally in the form of an extruded I beam having upper and lower flanges connected by an intermediate vertical web section. Each carriage is adapted slidably to engage a corresponding flange and is thereby adapted to traverse the datum bar. Each carriage preferably also includes locking means permitting the carriage to be releasably locked in selected positions along the datum bar.

Adjustable stops are preferably provided to limit the maximum travel of the connecting carriage in either direction and to provide positively defined end points on the datum bar. The datum bar preferably incorporates indicia to provide a quantitative indication of the adjusted position of each stop and hence the extreme position or end point of the trammel bar in either direction.

Advantageously, each first carriage assembly incorporates a swivel element permitting relative rotation of the datum bar about an axis generally horizontal and parallel to the centre line of the vehicle, thereby permitting the remote end of the datum bar to rest on a support surface such as the workshop floor whilst the first attachment assembly is secured to the vehicle. This conveniently permits attachment by a single operator, one side at a time. Preferably, however, the respective swivel elements do not permit relative rotation about axes transverse to the vehicle center line, and as such effectively retain the datum bar, once attached on both sides, in a fixed position relative to the selected datum points.

In one embodiment, the attachment means on each carriage comprises an outwardly opening tapered socket adapted for self-centering engagement with a horizontally oriented datum point in the form of a nut, bolt head or other suitable protrusion on the vehicle. In alternative embodiments, the attachment means may simply comprise a stud adapted for engagement with a complementary threaded hole formed in the vehicle. In other embodiments, a suitable nut engageable with a vehicle stud, or a special purpose or universal fitting may be provided.

In one particularly preferred form of the invention, the attachment means takes the form of a locating assembly adapted for operative engagement with a stud and nut on the vehicle wherein the free end of the stud defines a datum point and wherein the nut can be used to clamp the assembly to the vehicle body. Such a fitting is described in detail in copending PCT patent application number PCT/AU92/00538, the full contents of which is incorporated herein by reference.

In another embodiment, the attachment means takes the form of an adjustable three jawed universal clamp adapted releasably to grasp the protruding end of a suitable stud, bolt head or nut defining an appropriate datum point. A variation of this embodiment takes the form of an expanding three-jawed hole clamp adapted to expand into and locatingly engage the marginal edge of a suitable hole formed in the vehicle body. It will be appreciated, however, that any appropriate type of attachment fitting could also be used.

Advantageously, an adjustable spirit level is removably attached to the trammel bar to provide an indication of the inclination of the trammel bar, and thereby permit comparative measurement in vertical planes.

The spirit level can also be removed and calibrated directly against an appropriate notionally horizontal part of the vehicle body, such as a chassis rail or door sill. In this way, the spirit level when replaced on the trammel bar indicates inclination relative to the vehicle, irrespective of whether the vehicle itself is level.

In the preferred embodiment, the reference means comprises an adjustable pointer supported by a reference carriage slidably mounted to the trammel bar. The reference carriage preferably houses a measuring tape spool disposed such that the tape unwinds as the carriage slides outwardly toward the remote end of the trammel bar. The protruding end of the tape is preferably secured adjacent the proximal end of the trammel bar to define a zero position within a plane the relevant datum points and the datum bar. The measuring tape is preferably thereby calibrated to provide a measure of the effective distance of the reference pointer along the trammel bar.

The trammel bar itself preferably comprises at least two telescopically interengageable elements, and locking means adapted releasably to lock the telescopic elements in predetermined relative relationship. The locking means is preferably actuable by a knob disposed on or adjacent the remote end of the trammel bar, thereby permitting remote telescopic adjustment in situations where intermediate portions of the trammel bar may not be readily accessible.

The telescopic elements are preferably formed from slidably interengageable square hollow section tubes, and the locking means preferably includes a tapered wedge member or plug engageable with an expanding split sleeve, such that upon operation of the actuating knob disposed on the remote end of the trammel bar, the wedge member drives the respective elements of the split sleeve outwardly into clamping frictional engagement with the surrounding inner surface of one of the telescopic tubes.

BRIEF DESCRIPTION OF THE DRAWINGS

Preferred embodiments of the invention will now be described, by way of example only, with reference to the accompanying drawings in which:

FIG. 1 is a perspective view showing a vehicle gauging apparatus according to the invention;

FIG. 2 is a perspective view showing an alternative configuration of the reference pointer of the gauging apparatus of FIG. 1;

FIG. 4 is an enlarged side elevation of the detachable and adjustable spirit level assembly of the apparatus of FIG. 1;

FIG. 5 is an end elevation of the spirit level assembly of FIG. 4;

FIG. 6 is a longitudinal sectional view of the trammel bar of the gauging apparatus of FIG. 1 showing the locking mechanism.

PREFERRED EMBODIMENTS OF THE INVENTION

Figures 3, 3A:
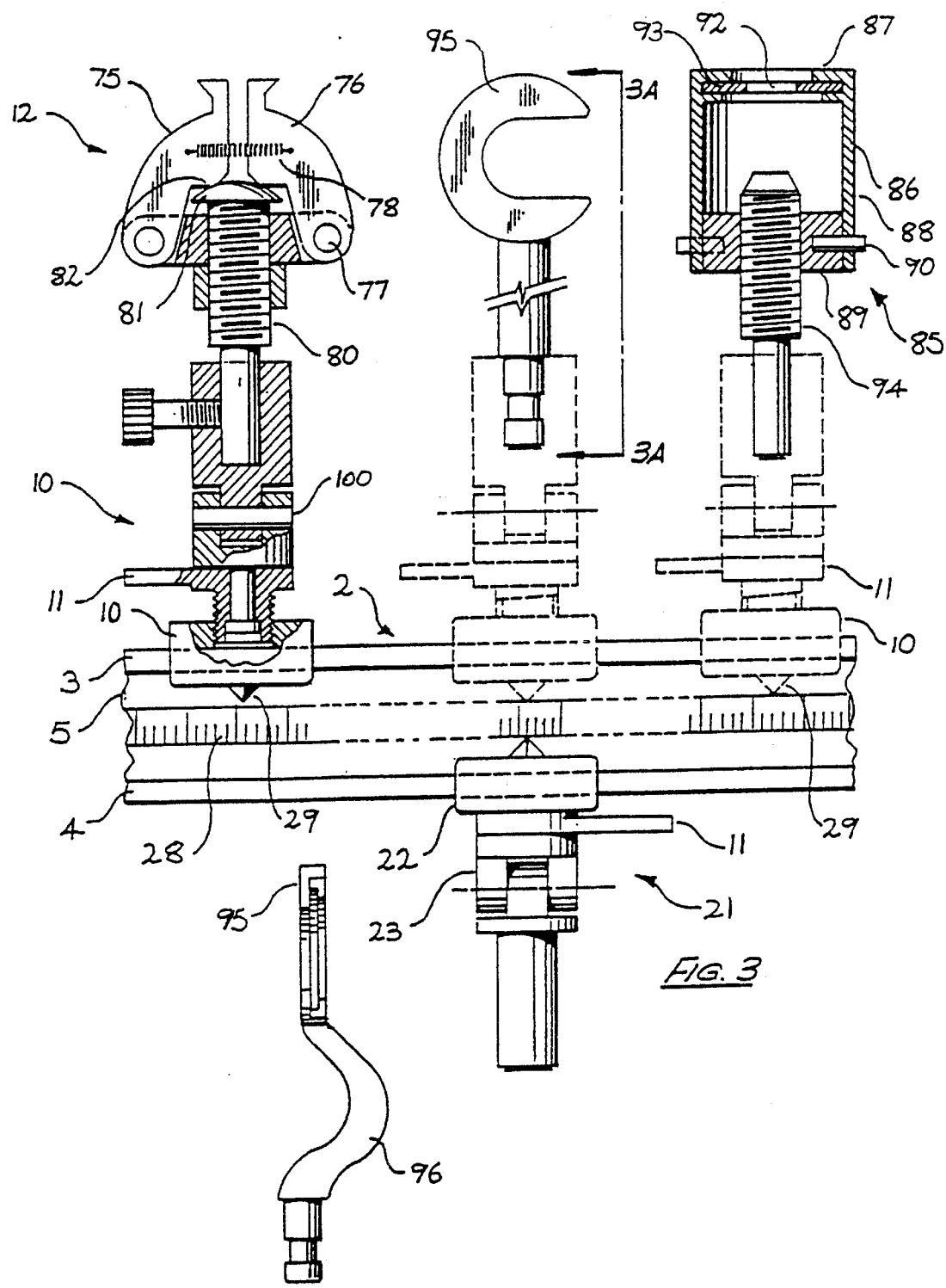
FIG. 3 is a front elevation of the datum bar and universal connecting joint of the apparatus of FIG. 1, showing alternative attachment fittings.
FIG. 3A is a side elevation taken along line 3A—3A of FIG. 3, showing one of the attachment fittings in more detail.

Referring firstly to FIG. 1, the invention provides a vehicle alignment gauging apparatus 1 including a transverse datum bar 2 comprising respective upper and lower flanges 3 and 4 interconnected by an intermediate web section 5. A pair of first carriage assemblies 10 are slidably mounted to the upper flange 3 to traverse the datum bar. Selectively operable locking mechanisms 11 are provided to permit the carriage assemblies to be releasably secured in selected positions on the bar.

Interchangeable attachment means 12 are adapted releasably to secure each carriage assembly 10 to a selected datum point 15 on the vehicle 16 thereby to attach the datum bar to the vehicle, as described in more detail below.

A trammel bar 20 is connected at one end to the datum bar 2 by a connecting assembly 21. The connecting assembly comprises a connecting carriage 22 adapted slidably to traverse the lower flange 4 of the datum bar, and an associated universal joint 23 in the form of a double swivel permitting independent rotation about intersecting vertical and horizontal orthogonal axes. Like the first carriages 10, the connecting carriage 22 incorporates a locking mechanism 11. Thus, the connecting carriage permits the proximal end of the trammel bar to be moved to and locked in selected positions along the datum bar, whilst the universal joint permits at least a limited degree of universal movement of the trammel bar relative to the connecting carriage.

Adjustable stops 25 are also slidably mounted to the lower flange 4 of the datum bar 2, and are adapted to be releasably secured in selected positions by respective threaded locking knobs 26. The adjustable stops 25 are provided to limit the maximum travel of the connecting carriage 22, and hence the proximal end of the trammel bar 20, in either direction and to provide positively defined but movable end points on the datum bar.

The datum bar further incorporates a calibrated scale 28 displayed on the vertical web section 5 whilst the first carriages 10, connecting carriage 22, and end stops 25 each incorporate pointers 29. In this way, the scale 28 and respective pointers 29 together provide indications of the relative positions of the carriages, end stops and trammel bar on the datum bar.

The apparatus further includes reference means in the form of a calibrated and adjustable reference pointer assembly 32. The reference pointer assembly comprises an inner rod 33 slidably disposed within a tubular rod housing 34. One end 35 of the rod 33 is threaded internally to receive a correspondingly threaded stud 36 extending from a conical pointer 37, in coaxial alignment with the rod. The opposite end 38 of the rod incorporates a corresponding bore extending transversely to the axis of the rod to locate the pointer 37 in a perpendicular orientation, as best seen in FIG. 2. Thus, by selecting the orientation of the inner rod 33 within the rod housing 34, the appropriate threaded fitting is presented to receive the pointer in the desired vertical or horizontal orientation. A grub screw 40 is provided to releasably secure the rod in the selected orientation.

As best seen in FIG. 1, the pointer assembly 32 is adjustably supported by a reference carriage 42. A scale 43 is provided to give a quantitative indication of the position of the pointer relative to the supporting carriage, which, in turn, is slidably mounted to the trammel bar 20. A further grub screw 46 is provided to secure the reference carriage 42 in any desired location along the trammel bar.

The reference carriage 42 further houses a spool 47 disposed to progressively wind or unwind a calibrated measuring tape 48 as the carriage 42 respectively slides inwardly or outwardly, as the case may be, on the trammel bar. The free end 50 of the tape 48 is secured to the proximal end of the trammel bar to define a zero position which lies in a plane intersecting the universal joint 23. The measuring tape is thereby calibrated to provide a measure of the effective distance of the reference pointer from the datum bar along the trammel bar. It will be appreciated that the unique feature of the measuring tape spool 47 being housed within the travelling reference carriage 42 enables effective measurement of particularly short distances, down to around 50 mm. Additional reference carriages supporting respective pointers may also be provided on the trammel bar to enable several comparative measurements to be taken simultaneously.

An adjustable spirit level assembly 55 is removably attached to the upper surface of the reference carriage 42 so that when the spirit level is zeroed, it provides an indication of the inclination of the trammel bar with respect to a true horizontal reference. The spirit level can thereby be used to permit comparative measurement in vertical planes, as described in more detail below.

The spirit level 55 can also be removed by means of suitable clips and recalibrated directly against an appropriate notionally horizontal part of the vehicle, such as a chassis rail or door sill. In this way, the spirit level when replaced on the reference carriage indicates inclination relative to the actual vehicle being measured. It can thereby conveniently provide a surrogate reference line with respect to the vehicle, irrespective of whether the vehicle itself is level.

The trammel bar preferably comprises two telescopically interengageable elements in the form of respective inner and outer square hollow section tubes 60 and 61. The reference carriage 42 housing the tape spool 47 is slidably disposed on the remote outer telescopic tube 61, whilst the connecting carriage 22, universal joint 23 and the free end 50 of the tape are mounted to the proximal end of the inner tube 60.

As best seen in FIG. 6, locking means 63 are provided to releasably lock the telescopic tubes 60 and 61 in the desired telescopically overlapping relationship. The locking means comprises an actuating knob 64 disposed axially on the remote end of the trammel bar. The actuating knob is fixedly connected to an actuating rod 65 which extends longitudinally within the inner and outer tubes. The actuating rod is threadedly connected at its other end with a square sided wedge or plug 67 engageable with a complementary split sleeve 68. The split sleeve is located axially by a lock nut 69 which is tightly screwed to the end of the thread and thereby locked to the rod. A second lock nut 70 on the remote end of the rod acts as a stop to prevent the wedge 67 from being inadvertently unthreaded from the rod. Thus, rotation of the actuating knob 64 draws the wedge or plug 67 into engagement with the split sleeve 68. This progressively drives the sleeve halves outwardly into clamping frictional engagement with the inner surface of the surrounding inner tube, thereby locking the tubes in the adjusted position. It will be appreciated that this remote locking facility permits convenient telescopic adjustment of the trammel bar in situations where intermediate portions of the bar may not be readily accessible.

Several forms of attachment means 12 are shown in FIG. 3, where corresponding features are denoted by corresponding reference numerals. The first form of attachment means is an expanding three-jawed hole clamp 75. This clamp is adapted to be mounted to a supporting carriage 10. The clamp includes three jaws 76 each supported for rotation about a respective pivot 77. The jaws are drawn together near their remote ends by springs 78 which extend through respective holes formed in the jaws. An actuating bolt 80 is provided with a domed head 81 to spread the jaws of the clamp outwardly against the bias force of the springs 78 upon engagement with abutting jaw surfaces 82. Thus, rotation of the domed bolt 80 relative to the jaw mounting assembly progressively drives the jaws 76 outwardly into self-centring engagement with the marginal edge of a suitable datum hole formed in the vehicle body. It should be noted that the respective curvatures of the domed bolt head 81 and abutting jaw surfaces 82 are matched such that relative expansion or contraction of the jaws within the intended operating range does not alter the overall length of the clamp and so does not affect the calibration of the system.

In many instances, the datum point on the vehicle is defined by a stud and nut assembly, and more particularly by the free end of the stud. In this case, locating assembly 85 can be conveniently used. This locating assembly includes a generally tubular body 86 comprising a substantially planar mounting portion 87 adapted to be clamped against the vehicle by the nut associated with the stud. The longitudinal side wall of the tubular body 86 defines a spacing section 88 adapted to support an internally threaded collar 89 in spaced apart generally coaxial relationship with respect to the vehicle stud.

As is described in copending PCT patent application number PCT/AU90/00538 referred to above, the collar 89 is releasably engageable with the tubular body 2 by means of a bayonet fitting comprising a series of outwardly protruding lugs 90 formed in the collar, and a corresponding series of complementary L-shaped slots formed in the body. In this way, removal of the collar provides convenient access to the vehicle nut for a conventional socket wrench.

The body preferably incorporates a side opening configured to accommodate the vehicle nut. Similarly, the mounting portion 87 includes a slot 92 extending radially outwardly from the centre to the peripheral edge. The side opening and radial slot 92 together enable the body to be slid transversely into position and located around the stud, without complete removal of the nut. The radial slot 92 is preferably defined by a slotted insert in the form of a washer 93 adapted releasably to clip into a corresponding circumferential recess formed in the body. The slotted washer is interchangeable with a variety of similar washers incorporating different sized slots, thereby enabling the assembly to be adapted for use with vehicle studs of different diameters.

The assembly further includes an elongate locating element in the form of a locating stud 94 in threaded engagement with the collar 89. The locating stud 94 is thereby axially displaceable (upon rotation) with respect to the collar and as such can be tightened to abut the free end of the vehicle stud. The remote end of the locating stud 90 is in turn adapted for connection to a carriage 10.

A third form of attachment means is also shown in FIG. 3. In this case, the attachment fitting incorporates a vertically oriented generally planar mounting portion 95 adapted to receive interchangeable slotted inserts in a manner similar to the assembly described above. However, this attachment fitting is adapted for connection to horizontally oriented nut and bolt or stud bolt arrangements such as those associated with rear spring or trailing arm suspension assemblies. The curved vertical spacers 96 are provided in a right and left handed pair to enable the datum bar to be mounted below the rear suspension of the vehicle. In use, these or other appropriate attachment assemblies are chosen depending upon the particular type, configuration and position of datum points selected.

The scales provided on the datum bar, the measuring tape, and the reference pointer assembly are calibrated having regard to the dimensions of the apparatus such that the readings can be correlated directly to reference measurements provided on the manufacturer's data sheets. In other words, the scales can be calibrated such that each datum point on the vehicle corresponds directly to a coordinate origin on the data sheet.

It will be seen from FIG. 1 that each carriage assembly 10 incorporates a swivel element 100 disposed intermediate the carriage slide and the associated attachment element. Each swivel element is aligned in use to permit relative rotation of the datum bar about an axis normal to the web of the datum bar and generally parallel to the centre line of the vehicle. This permits one end of the datum bar to rest on the workshop floor, whilst the first attachment assembly is secured to the vehicle. This conveniently facilitates attachment by a single operator, one side at a time, and is particularly advantageous when the apparatus is being secured to the underside of the vehicle where access is often restricted. However, the swivel elements 100 when aligned in this way do not permit relative rotation about axes transverse to the vehicle centre line and as such effectively retain the datum bar, once attached on both sides, in a fixed position and orientation relative to the selected datum points.

Figure 7:
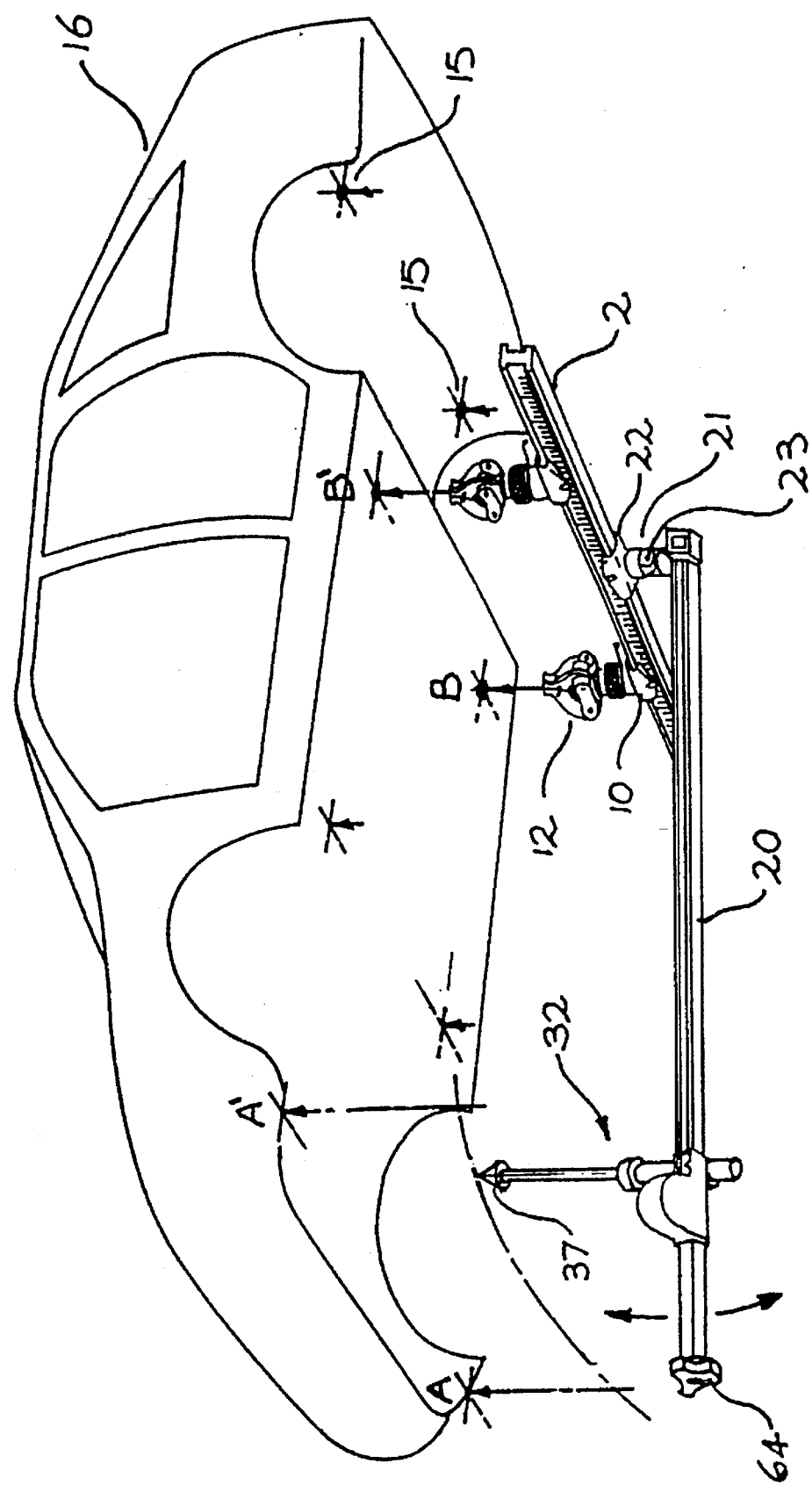
FIG. 7 is a diagrammatic perspective view showing the gauging apparatus being offered up to selected datum points on a vehicle body.

Turning now to describe the operation of the apparatus, and with particular reference to FIGS. 1 and 7, intersecting suitable attachment fittings are first selected according to the type of vehicle, the particular configuration of datum points, and the nature of the damage sustained. The selected attachment fittings are then operatively affixed to the respective carriage assemblies 10. The attachment fittings are then offered up and secured to the selected datum points to fix the datum bar 2 in position. In the majority of cases, the datum bar will be suspended in a generally horizontal orientation beneath the vehicle, transverse to the vehicle centre line.

The adjustable spirit level assembly 55 is then removed from its mounting on the reference carriage, placed on an appropriate notionally horizontal component of the vehicle such as a chassis rail, door sill, or the like, and zeroed. The spirit level is then replaced on the trammel bar for use as a surrogate level reference, relative to the vehicle. It will be appreciated that in this way, the vehicle itself need not be precisely level.

Assuming for example, that the letter referenced data points A, A', B and B' in FIG. 7 are to be correlated, the end stops 25 are then adjusted on the datum bar relative to the datum points and carriages 10 to define the limit of travel of the intermediate connecting carriage 22 in either direction. Normally at each such limit, the universal joint 23 connecting the trammel bar to the transverse datum bar would be disposed directly below the respective datum point. The end stops are then locked in the adjusted positions by manual rotation of locking knobs 26. Similarly, the carriage assemblies 10 are manually secured with locking mechanisms 11 such that the datum bar is firmly secured relative to the selected datum points. The overall length of the trammel bar can then be conveniently adjusted, using the remote actuating knob 64, to the most convenient length have regard to the particular datum points which need to be correlated. The effective length of the reference pointer assembly 32 can then also be adjusted with reference to the manufacturer's data sheets if appropriate, according to the calibrated scale on the rod housing 34.

With the apparatus quickly and conveniently set up in this way, virtually any points on the vehicle body can be correlated. For example, to measure the horizontal distance between datum points A and B, the connecting carriage is moved to abut the end stop on the corresponding side of the datum bar. In this way, the end stop locates the proximal end of the trammel bar in a zero position immediately below datum point B. The grub screw 46 on the reference carriage is then loosened and the carriage slid along the trammel bar until the reference pointer 37 touches datum point A. During this process, the measuring tape 48 unwinds from spool 47. With the reference carriage thus positioned, the grub screw 46 is tightened and the reading on the measuring tape 48 indicates the distance between the datum points A and B. To measure the corresponding distance between datum points A' and B' on the other side of the vehicle, the connecting carriage 22 is simply slid along the datum bar until it abuts the end stop 25 on the other side, at which point the proximal end of the trammel bar is positioned directly below the datum point B'. Thus, point B' becomes the new reference point for the trammel bar. The pointer 37 is then simply presented to the corresponding datum point A'. In each case, the proximal end of the trammel bar is simply located by a gentle manual pressure urging the connecting carriage 22 against the respective end stop. Any difference in the distances AB and A'B' will be immediately apparent, and can be quantified simply by readjusting the position of the reference carriage 45 and noting the difference in readings from the measuring tape.

A diagonal measurement such as from datum points B' to A may simply be taken by swinging the trammel bar diagonally across the vehicle, and aligning the pointer with the appropriate diagonally opposed datum point. The connecting carriage can then simply be traversed to the opposite side of the datum bar, and a comparative measurement taken between points A' and B. Any discrepency between the two readings provides as quantitative indication of the degree of parallelogram type structural misalignment. This facility provides a significant advantage over the prior art, since the inability to take direct diagonal measurements inherent in most known apparatus often prevents parallelogram misalignment from being detected.

Thus, the apparatus may be used to provide quick and effective comparative measurements between corresponding points on either side of the vehicle, without reference to data sheets. If one side of the vehicle is undamaged, it may be used as a reference for repairing the damaged side. The ability of the connecting carriage and associated universal joint to traverse the datum bar intermediate the end stops is a particularly advantageous feature in this context, since it allows the proximal end of the trammel bar to be swung quickly yet precisely from one side to the other as often as required, without the need for the operator to align and clamp the carriage in position each time under the vehicle, where access is restricted.

It should also be noted that the universal joint is able to swivel about its vertical axis for a full 360°, thereby permitting measurements to be taken fore and aft of the datum bar. The universal joint preferably also accommodates rotation through an angle of well in excess of 180° about its horizontal axis.

As best seen in FIG. 1, a side mounting bracket 105 is adapted to be inserted into a correspondingly shaped axial bore formed in the datum bar. This bracket serves as a datum bar extension, and also incorporates an end flange 106 adapted to receive a connecting assembly 107 engageable with the trammel bar 20. The connecting assembly 107 is located vertically by projecting lug 108. In this way, the cross bar extension and bracket 105 enable the trammel bar to be mounted to either end of the datum bar to facilitate comparative measurements along the sides of the vehicle.

It will be appreciated from the foregoing description that the invention provides a simple, efficient and cost effective system for conducting a wide range of measurements on damaged vehicles, either by correlation to data sheets, or direct comparison of corresponding points on the vehicle. The system is easy to use by a single operator, and can be used with the various attachment fittings on almost any vehicle with minimal set up time. It is capable of providing both orthogonal and diagonal measurements, as well as comparative measurements in complex spatial orientations. Thus, the invention represents a commercially significant improvement over the prior art.

Although the invention has been described to specific examples, it will be appreciated by those skilled in the art that the invention may be embodied in many other forms.

I claim:

1. A vehicle gauging apparatus including a datum bar, a pair of first carriage assemblies slidably mounted to said bar, attachment means adapted to releasably secure each of said first carriage assemblies to a respective datum point on the vehicle and thereby attach the datum bar to the vehicle, a trammel bar connected at one end to said datum bar by connection means adjustable to selected positions along the datum bar and permitting at least a limited degree of universal movement of the trammel bar relative to the datum bar, and reference means on the trammel bar to provide a comparative indication of misalignment in the vehicle.

2. An apparatus according to claim 1, wherein the datum bar is adapted to be suspended generally transversely beneath the vehicle.

3. An apparatus according to claim 2, wherein the connecting means comprises a connecting carriage adapted to traverse the datum bar, and a universal joint mounted to the connecting carriage to permit independent relative rotation about at least two non-parallel axes.

4. An apparatus according to claim 3, wherein said universal joint comprises a double swivel mechanism disposed to permit independent relative rotation about two orthogonal axes.

5. An apparatus according to claim 1, wherein the datum bar has a generally I shaped cross sectional configuration defining upper and lower flanges connected by an intermediate web section.

6. An apparatus according to claim 5, wherein each carriage assembly is adapted to slidably engage one of said flanges, and is thereby adapted to traverse the datum bar.

7. An apparatus according to claim 6, wherein each said carriage includes locking means permitting the carriage to be releasably locked in selected positions along the datum bar.

8. An apparatus according to claim 7, wherein each said locking means comprises a grub screw.

9. An apparatus according to claim 8, further including adjustable end stops disposed to limit the maximum travel of the connecting means in either direction on the datum bar.

10. An apparatus according to claim 9, wherein said datum bar includes indicia to provide a quantitative indication of the adjusted position of each said end stop and hence to indicate an end position of the connection means in either direction on the datum bar.

11. An apparatus according to claim 10, wherein said end stops take the form of carriage slides engageable with the lower flange of said datum bar.

12. An apparatus according to claim 1, wherein each said first carriage assembly incorporates a swivel element permitting relative rotation between the attachment means and the datum bar about an axis generally perpendicular to the datum bar, thereby permitting one end of the datum bar to rest on a support surface whilst the attachment means on the opposite end is secured to the vehicle.

13. An apparatus according to claim 12, wherein said swivel elements do not permit relative rotation about axes transverse to the vehicle center line.

14. An apparatus according to claim 1, wherein said attachment means comprises an outwardly opening tapered socket adapted for self-centring engagement with a datum point in the form of a horizontally oriented protrusion on the vehicle.

15. An apparatus according to claim 1, wherein said attachment means includes a locating assembly adapted for operative engagement with a stud and nut on the vehicle wherein the free end of the stud defines a datum point, said locating assembly including a body comprising a generally planar mounting portion adapted to be clamped to the vehicle by the nut, a spacing portion adapted to support a collar in spaced apart generally coaxial relationship with respect to the vehicle stud, and an opening adapted to provide access to the nut, said locating assembly further including an elongate locating element mounted for axial displacement with respect to the collar and being adjustable to abut the free end of the stud, the remote end of the locating element being adapted for connection to one of said first carriage assemblies.

16. An apparatus according to claim 15, wherein said locating element comprises a threaded locating stud engageable with a correspondingly threaded aperture formed in the collar, such that said axial displacement is effected by rotation of the locating stud relative to the collar.

17. An apparatus according to claim 16, wherein said body incorporates a side opening adapted to accommodate the vehicle nut and wherein said mounting portion includes a radial slot adapted to accommodate and centrally locate the vehicle stud, said side opening and said slot together enabling the body to be slid transversely into position around the stud without removal of the nut.

18. An apparatus according to claim 1, wherein said attachment means takes the form of an adjustable universal clamp having a plurality of jaws adapted releasably to grasp a suitable protrusion defining a datum point.

19. An apparatus according to claim 1, wherein said attachment means comprises a hole clamp having a plurality of jaws adapted to expand into and locatingly engage the marginal edge of a suitable hole formed in the vehicle body.

20. An apparatus according to claim 19, wherein said hole clamp includes at least three mutually opposed jaws each supported for rotation about a respective pivot axis, resilient bias means disposed to draw the remote ends of said jaws together, and an actuating element disposed to progressively to spread the jaws outwardly against an opposing force of said resilient bias means and into self-centering engagement with the marginal edge of the hole.

21. An apparatus according to claim 20, wherein said actuating element comprises a threaded stud having a domed head simultaneously engageable with corresponding abutment surfaces formed on the respective jaws, said domed head and said abutment surfaces having respective curvatures configured such that relative expansion or contraction of the jaws within an intended operating range does not alter the overall length of the clamp and thereby does not affect calibration of the apparatus.

22. An apparatus according to claim 1, further including level indicating means to provide an indication of the relative inclination of the trammel bar.

23. An apparatus according to claim 22, wherein said level indicating means comprises a spirit level.

24. An apparatus according to claim 23, wherein said spirit level is removable and adjustable, to permit the level to be zeroed against notionally horizontal parts of the vehicle, and thereby to provide an indication of inclination relative to the vehicle.

25. An apparatus according to claim 1, wherein said reference means comprises an adjustable pointer supported by a reference carriage slidably mounted to the trammel bar.

26. An apparatus according to claim 25, wherein said reference carriage incorporates a measuring tape spool disposed such that the measuring tape unwinds as the reference carriage slides outwardly toward the remote end of the trammel bar.

27. An apparatus according to claim 26, wherein the protruding end of the tape is secured toward the proximal end of the trammel bar to define a zero position within a plane intersecting selected datum points and the datum bar.

28. An apparatus according to claim 27, wherein said measuring tape is calibrated to provided a measure of the effective distance of the reference pointer along the trammel bar.

29. An apparatus according to claim 28, wherein the reference carriage and measuring tape are adapted to be secured in selected positions along the trammel bar by means of a grub screw.

30. An apparatus according to claim 1, wherein said trammel bar comprises at least two telescopically interengageable elements and locking means adapted to releasably lock the telescopic elements in predetermined relative relationship.

31. An apparatus according to claim 30, wherein said locking means is actuable by means disposed on or adjacent the remote end of the trammel bar thereby permitting remote telescopic adjustment in situations where intermediate portions of the trammel bar are inaccessible.

32. An apparatus according to claim 31, wherein the telescopic elements are formed from slidably interengageable hollow tubes, and wherein the locking means includes a tapered wedge member engageable with an expanding split sleeve such that upon operation of an actuating knob disposed in the remote end of the trammel bar, the wedge member drives the respective elements of the split sleeve outwardly into clamping frictional engagement with the surrounding inner surface of one of the telescopic tubes.

33. An apparatus according to claim 32, wherein said telescopic elements are formed from square hollow section tubes, the inner tube being connected to the datum bar via the connection means and housing the wedge member and split sleeve, the outer tube being remote from the connection means and supporting the actuating knob.

34. An apparatus according to claim 1, further including a bracket connected to or engageable with either end of the datum bar, said bracket being engageable with connection means permitting the trammel bar to be connected to either end of the datum bar to facilitate comparative measurement along the sides of the vehicle.

35. An apparatus according to claim 34, wherein said bracket includes a datum bar extension section adapted to be releasably retained within a complementary axial bore formed in the datum bar.

\* \* \* \* \*